United States Patent
Smedley et al.

(10) Patent No.: US 10,074,995 B2
(45) Date of Patent: Sep. 11, 2018

(54) BATTERY MANAGEMENT CONVERTER SYSTEM

(71) Applicants: Gregory Smedley, Aliso Viejo, CA (US); Keyue Smedley, Aliso Viejo, CA (US); Roozbeh Naderi, Irvine, CA (US)

(72) Inventors: Gregory Smedley, Aliso Viejo, CA (US); Keyue Smedley, Aliso Viejo, CA (US); Roozbeh Naderi, Irvine, CA (US)

(73) Assignees: THE REGENTS OF THE UNIVERSITY OF CALIFORNIA, Oakland, CA (US); ONE-CYCLE CONTROL. INC., Oakland, CA (US)

( * ) Notice: Subject to any disclaimer, the term of this patent is extended or adjusted under 35 U.S.C. 154(b) by 698 days.

(21) Appl. No.: 14/318,047

(22) Filed: Jun. 27, 2014

(65) Prior Publication Data

US 2015/0002099 A1     Jan. 1, 2015

Related U.S. Application Data

(60) Provisional application No. 61/840,962, filed on Jun. 28, 2013.

(51) Int. Cl.
*H02J 7/00* (2006.01)
*H02M 1/00* (2006.01)

(52) U.S. Cl.
CPC .......... *H02J 7/0018* (2013.01); *H02J 7/0026* (2013.01); *H02J 7/0052* (2013.01); *H02J 2007/0059* (2013.01); *H02M 2001/0074* (2013.01); *H02M 2001/0077* (2013.01)

(58) Field of Classification Search
CPC ...... H02J 7/0018; H02J 7/0026; H02J 7/0052; H02J 2007/0059
USPC .......................................... 320/119, 134, 163
See application file for complete search history.

(56) References Cited

U.S. PATENT DOCUMENTS

| | | | |
|---|---|---|---|
| 2010/0207579 A1* | 8/2010 | Lee ........................ | H02J 7/0018 320/120 |
| 2011/0074354 A1* | 3/2011 | Yano .................... | H01M 10/441 320/116 |
| 2011/0210701 A1* | 9/2011 | Nakamura .......... | H01M 10/441 320/118 |

* cited by examiner

*Primary Examiner* — Edward Tso
*Assistant Examiner* — Aaron Piggush
(74) *Attorney, Agent, or Firm* — Thomas|Horstemeyer, LLP.

(57) ABSTRACT

Aspects of a battery management converter system are described. In one embodiment, a battery management converter system includes an arrangement of a plurality of battery converter cells, where each battery converter cell includes one or more battery cells and a switching power converter. The system further includes a battery converter cell controller for each of the plurality of battery converter cells, and a battery management converter controller that receives battery status information from each battery converter cell controller and provides control references to distribute charging or discharging power among the plurality of battery converter cells.

18 Claims, 6 Drawing Sheets

BATTERY MANAGEMENT CONVERTER SYSTEM

CROSS-REFERENCE TO RELATED APPLICATION

This application claims the benefit of U.S. Provisional Application No. 61/840,962, filed Jun. 28, 2013, the entire contents of which is hereby incorporated herein by reference.

BACKGROUND

Batteries are being relied upon more extensively as an intermediary in power conversion and storage systems. Typically, batteries or battery cells have terminal voltages ranging from about 1 to 5V depending upon the type or chemical process of the battery. However, as some systems require higher voltage and power outputs, new battery configurations are being explored. To address this need, a plurality of battery cells may be connected in series to achieve a larger terminal voltage. Depending upon the application, battery cells may be connected in series or arallel to form a block of battery cells, and multiple blocks of battery cells may be connected in series. These battery configurations require management systems to maintain safe operation and operating parameters for the battery cells.

BRIEF DESCRIPTION OF THE DRAWINGS

For a more complete understanding of the embodiments and the advantages thereof, reference is now made to the following description, in conjunction with the accompanying figures briefly described as follows.

Figure 1:
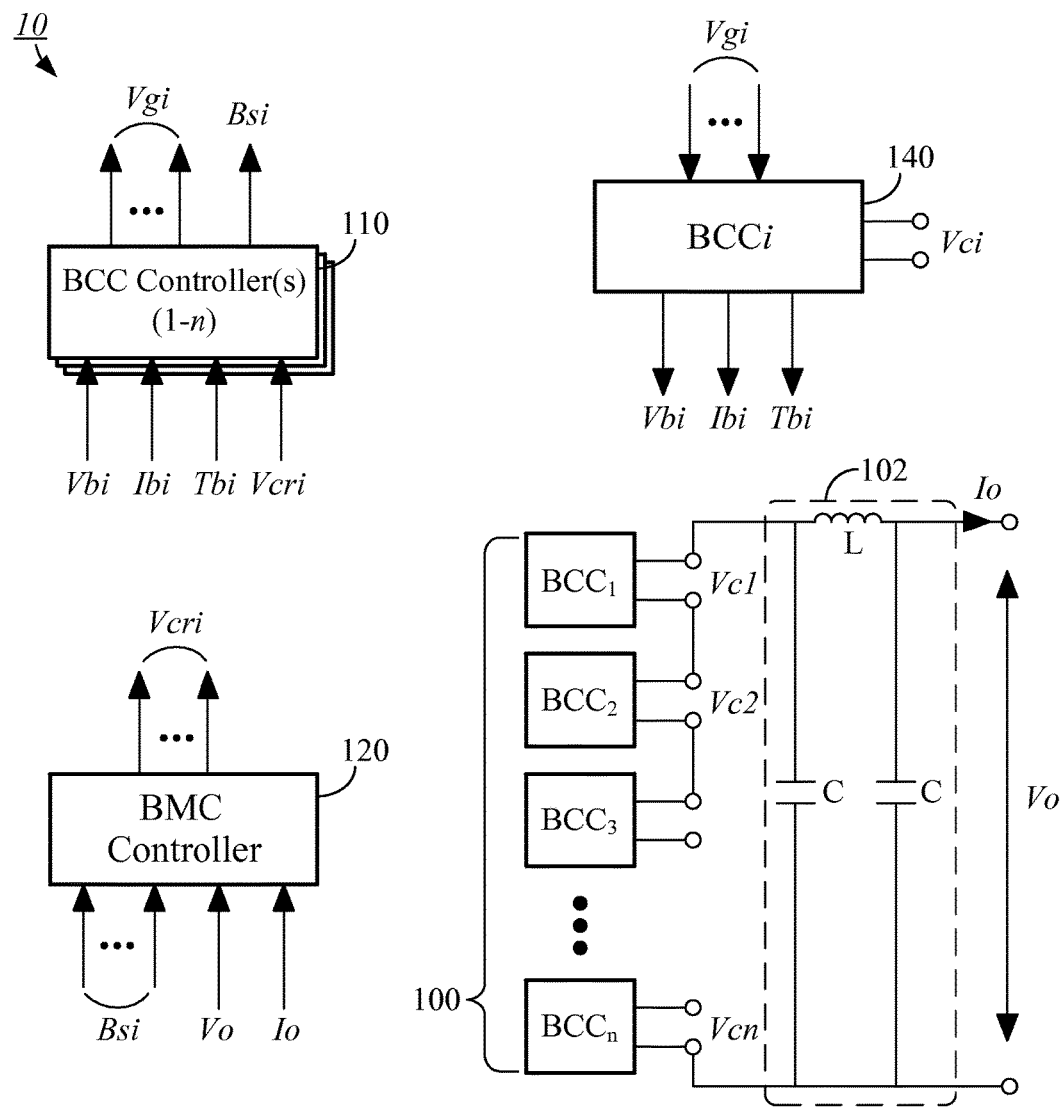
FIG. 1 illustrates a battery management converter system according to an example embodiment.

The drawings illustrate only exemplary embodiments and are therefore not to be considered limiting of the scope of the embodiments described herein, as other equally effective embodiments are within the scope and spirit of this disclosure. The elements and features shown in the drawings are not necessarily drawn to scale, emphasis instead being placed upon clearly illustrating the principles of the exemplary embodiments. Additionally, certain dimensions or positionings may be exaggerated to help visually convey certain principles. In the drawings, similar reference numerals between figures designate like or corresponding, but not necessarily identical, elements.

DETAILED DESCRIPTION

Aspects and embodiments of a battery management converter (BMC) system are described herein. Further, aspects and embodiments of battery management converter architectures and battery management converter control are also described. According to various aspects of the embodiments, battery energy storage systems may include batteries or battery cells, a battery management system (BMS), and one or more power converters. A BMS may monitor the state of one or more battery cells, calculate parameters associated with the battery cells, protect the battery cells, and balance the battery cells based on several variables. A BMS may include active and/or passive circuitry that balances and/or bypasses battery cells depending upon the output voltage of each of the battery cells, for example. It is noted, however, that the output voltage of a battery cell is only one parameter related to its overall state of charge, which may depend upon various factors including the type of the battery cell, the age of the battery cell, and the temperature of the battery cell, among other factors. One or more power converters may be relied upon to realize charging, discharging, and output voltage and current control.

In the overall context outlined above, the embodiments described herein include a BMC system that seeks to balance battery cells based on various factors and considerations while charging and discharging the battery cells. For example, in view of the need to achieve larger terminal voltages, a BMC system may be relied upon to ensure safe and prolonged operation of battery cells and, particularly, battery cells coupled in series with each other. According to other aspects, power converters and inverters that perform charging, discharging, and power conversion to and from DC, AC, battery, and power-grid tied system elements are described. Among other features, certain improvements and/or advantages of the embodiments include: (1) reduced battery energy storage system complexity, (2) improved system reliability, (3) reduced cost, (4) relatively higher energy efficiency, and (5) relatively improved waveform quality.

Turning now to the drawings, an introduction and general description of exemplary embodiments of a BMC system is provided, followed by a description of the operation of the same.

FIG. 1 illustrates a BMC system 10 according to an example embodiment. Among other elements, the system 10 includes n battery converter cells (BCCs) BCCs 1-n arranged in an arrangement of BCCs 100, an output filter 102 coupled across an output terminal of the arrangement of BCCs 100, a BCC controller 110, and a BMC controller 120. The BCC controller 110 is, in certain embodiments, representative of multiple controllers. Particularly, the system 10 may include a BCC controller 110 for each BCC in the arrangement of BCCs 100 (i.e., BCC controllers 1-n 100), respectively, as further described below. It should be appreciated that, in various embodiments, the output filter 102 may be omitted or varied in form or structure. Although a capacitor, inductor, capacitor (CLC) (i.e., capacitor input Pi) filter is illustrated in FIG. 1, another filter structure or topology suitable for the application may be relied upon.

In FIG. 1, the BCCi 140 is illustrated as a representative BCC among the BCCs in the arrangement of BCCs 100. In other words, the BCCi 140 may be representative of any of the BCCs 1-n in the arrangement of BCCs 100, where i=1, 2, . . . , n. Referring to the BCCi 140 in FIG. 1, representative inputs and outputs for each of the BCCs 1-n are illustrated. It is noted that one or more gate trigger signals Vgi of one of the BCC controllers 1-n 110 are provided as inputs to a corresponding BCCi 140 (i.e., one of the BCCs in the arrangement of BCCs 100), and battery status information Vbi, Ibi, and Tbi outputs from the BCCi 140 are provided as inputs to the one of the BCC controllers 1-n 110. The battery status information Vbi, Ibi, and Tbi outputs are representative of battery cell output voltage, battery cell output current, and battery cell temperature, respectively. In various embodiments, other battery status information may be relied upon, such as battery charging/discharging duty cycle, age, type, pressure, etc. For simplicity of discussion, the output voltages of the BCCs 1 to n are labeled Vci in FIG. 1, where i=1, 2, . . . , n, and n is the number of BCCs in the arrangement of BCCs 100. The output voltage Vo of the BMC system 10 is the sum of the Vci voltages, as provided by equation (1) below.

$$Vo = \sum_{i=1}^{n} Vci \quad (1)$$

As also illustrated in FIG. 1, the battery status signal Bsi output from each of the BCC controllers 1-n 110 is provided as an input to the BMC controller 120, and respective ones of the voltage reference signal Vcri outputs from the BMC controller 120 are provided to corresponding ones of the BCC controllers 1-n 110. Further, the output voltage Vo and output current Io of the system 10 are provided as inputs to the BMC controller 120 to form a closed control loop that operates according to one or more distribution control strategies described in further detail below. The BMC controller 120 receives the battery status signals Bsi from each of the BCC controllers 1-n 110 and controls, manages, or distributes charging or discharging power for each BCC in the arrangement of BCCs 100 according to respective reference voltage reference signals Vcri. In certain embodiments, the BMC controller 120 and the BCC controllers 1-n 110 may be embodied as an integrated battery management controller that performs a combination of the functions of the BMC controller 120 and the BCC controllers 1-n 110 described herein.

It is noted that the BMC system 10 may vary in system elements, system topology, or system arrangement, in various embodiments. For example, in place of the arrangement of BCCs 100, the BMC system 10 may include any number of BCCs in series, parallel, or combinations of series and parallel arrangements. Alternatively, in place of the arrangement of BCCs 100, the BMC system 10 may include a single BCC. In this case, the single BCC may include a high gain isolated or non-isolated bidirectional switching power converter. For example, a BIG-D switching power converter may be relied upon in this case to charge and/or discharge to and/or from a DC or single, double, or three phase AC voltage source. The number and arrangement of BCCs selected in the BMC system 10 may depend on the desired output voltage or the type of switching power converters used, etc. In other aspects, the BMC system 10 may be coupled in series or parallel with other BMC or battery management converter systems to form higher current and/or voltage systems. Further, it is noted that a combination of different types of BCCs (e.g., switching power converters, battery cells, etc.) may be relied upon in the BMC system 10.

Figure 2A:
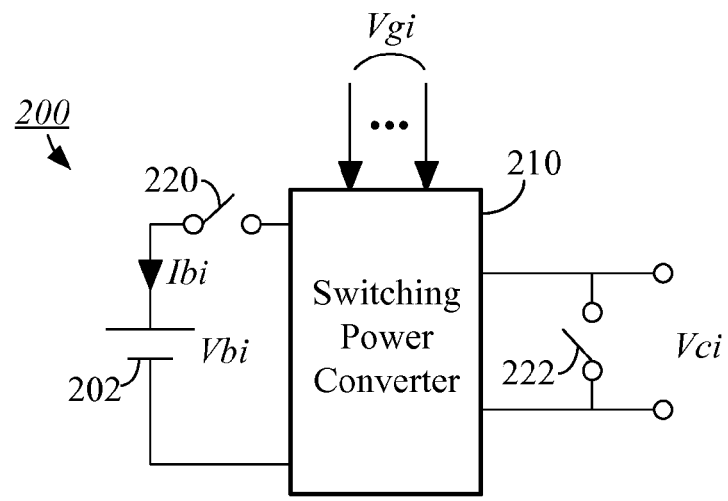
FIG. 2A illustrates a battery converter cell that may be relied upon in the battery management converter system of FIG. 1 according to an example embodiment.

According to an example embodiment, FIG. 2A illustrates a representative BCC 200 that may be relied upon in the arrangement of BCCs 100 in the BMC system 10 of FIG. 1. In FIG. 2A, the BCC 200 includes a battery cell 202 and a switching converter 210. Corresponding to the nomenclature outlined in FIG. 1, the battery cell 202 is associated with an output voltage Vbi and an output current Ibi, and the BCC 200 is associated with an output voltage Vci. In one embodiment, the BCC 200 also includes one or more internal protection switches, such as the battery protection switch 220, which may be embodied as a relay or solid state switch device. As illustrated in FIG. 2A, the battery protection switch 220 is serially coupled between the battery cell 202 and the switching converter 210 and may be relied upon to electrically disconnect the battery 202 from the switching converter 210. The BCC 200 may also include one or more bypass switches, such as the bypass switch 222. As illustrated, the bypass switch 222 may be coupled across output terminals of the BCC 200, to bypass the BCC 200 in the arrangement of BCCs 100, for example, in the event of failure. It is noted that one or more of the switches 220, 222 may be omitted, for example, to save costs or if the arrangement of the switching converter 210 permits battery isolation and/or bypassing the BCC 200 when a fault condition is detected.

Figure 2B:
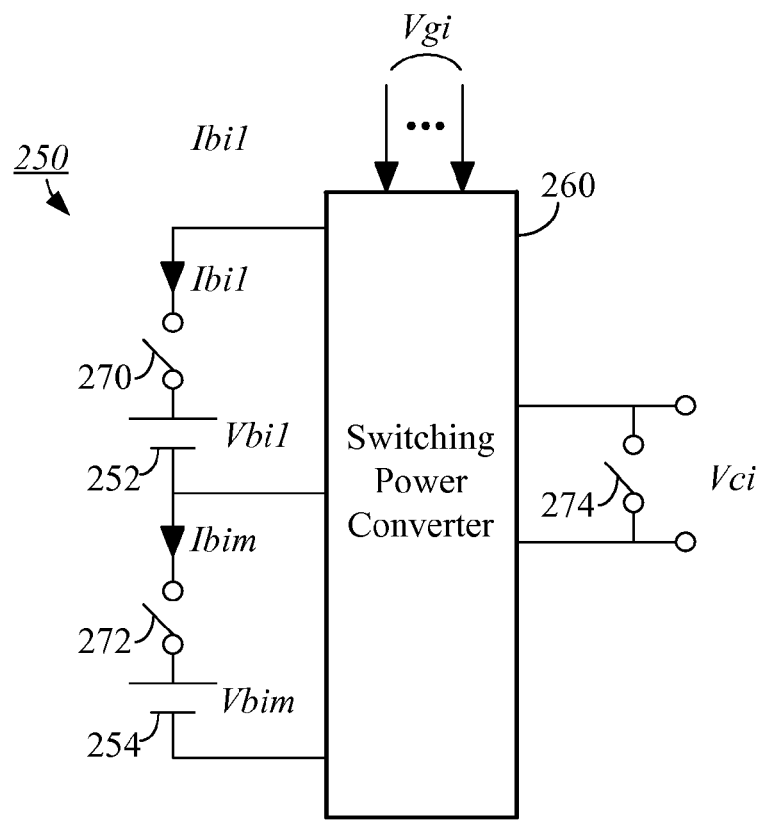
FIG. 2B illustrates another battery converter cell that may be relied upon in the battery management converter system of FIG. 1 according to an example embodiment.
Figure 3:
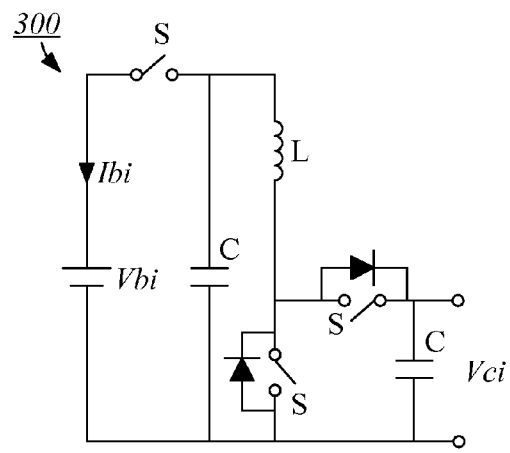
FIGS. 3-6 illustrate representative example topologies of switching or switched-mode converters that may be relied upon in the battery management converter system of FIG. 1 according to example embodiments.
Figure 4:
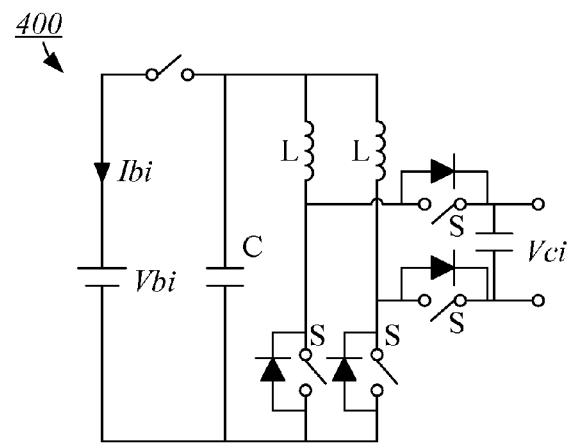
Figure 5:
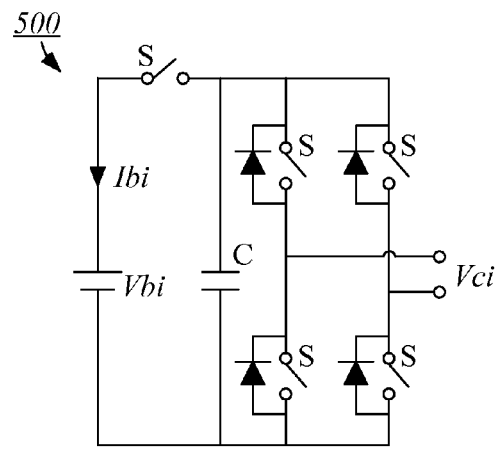
Figure 6:
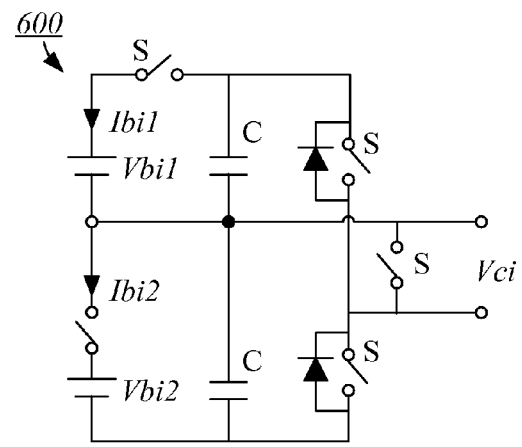

According to another example embodiment, FIG. 2B illustrates a representative BCC 250 that may be relied upon in the arrangement of BCCs 100 in the BMC system 10 of FIG. 1. As illustrated in FIG. 2B, the BCC 250 includes battery cells 252 and 254 and a switching converter 260. Thus, it should be appreciated that certain BCCs may include more than one battery cell, having voltages and currents designated Vbij and Ibij, respectively, where j=1, 2, . . . , m. The battery cells 252 and 254 are associated with output voltages Vbi1 and Vbim and output currents Ibi1 and Ibim, respectively. The BCC 250 is associated with an output voltage Vci. While the battery cells 252 and 254 are illustrated in a series arrangement in FIG. 2B, the battery cells 252 and 254 may be arranged in a parallel arrangement. Additionally, the BCC 250 may include any number of battery cells among embodiments, in series, parallel, or combinations of series and parallel arrangements.

In one embodiment, the BCC 250 also includes one or more internal protection switches, such as the battery protection switches 270 and 272, which may be embodied as relay or solid state switch devices. As illustrated in FIG. 2B, the battery protection switches 270 and 272 are serially coupled between the battery cells 252 and 254 and the switching converter 260, respectively, and may be relied upon to electrically disconnect the battery cells 252 and 254 from the switching converter 260. The BCC 250 may also include one or more bypass switches, such as the bypass switch 274. As illustrated, the bypass switch 274 may be coupled across output terminals of the BCC 250, to bypass the BCC 250 in the arrangement of BCCs 100, for example, in the event of failure. It is noted that one or more of the switches 270, 272, and 274 may be omitted, for example, to save costs or if the arrangement of the switching converter 260 permits battery isolation and/or bypassing the BCC 250 when a fault condition is detected.

Among embodiments, the switching converters 210 and 260 in FIGS. 2A and 2B, respectively, may be embodied as any suitable topology of switching or switched-mode converter, including various isolated and non-isolated derivatives, that convert a DC battery voltage to a DC or AC output voltage. Generally, the switching converters 210 and 260 may be embodied as controlled switching regulators that convert electrical power at one voltage and current specification to another voltage and current specification. Unlike a linear regulated converter, the switching regulators of the switching converters 210 and 260 continually switch between on and off states, and avoid the high dissipation transitions, minimizing wasted energy.

FIGS. 3-6 illustrate representative example topologies of switching or switched-mode converters that may be relied upon in the BMC system 10 of FIG. 1 according to example embodiments. The representative example switching or switched-mode converters include a boost DC/DC switching power converter 300 in FIG. 3, a boost DC/AC switching power converter 400 in FIG. 4, a full-bridge switching power converter 500 in FIG. 5, and a half-bridge switching power converter 600 in FIG. 6. Each of the switching power converters 300, 400, 500, and 600 may be embodied as a switching circuit including one or more inductive elements L, capacitive elements C, and switching elements S, as would be appreciated. In various embodiments, the switching elements S may be embodied as any suitable type of switch, such as field effect or integrated gate bipolar power transistors, for example. Further, certain ones of the switching elements S may be driven or actuated by one or more gate trigger signals Vgi provided from a corresponding one of the BCC controllers 1-n 110, for example, as discussed above with reference to FIG. 1.

It is noted that the half-bridge switching power converter 600 may be connected in side-by-side or back-to-back fashion. Use of other converters such as buck, buckboost, Ćuk, single-ended primary-inductor converter (SEPIC), Zeta, BIG-D, etc., and derivatives thereof are within the scope and spirit of the embodiments. Further, as noted above, one or more of the BCCs 1-n in the BMC system 10 may be interleaved or non-interleaved, in series, parallel, or combination series and parallel arrangements. Additionally, if a buck-derived converter is relied upon, then all BCCs in the BMC system 10 may share one inductor in a common series path.

With reference again to FIG. 1, turning to aspects of control in the BMC system 10, the BCC controllers 1-n 110, under control of the BMC controller 120, are relied upon to provide gate trigger signals Vgi for the switching power converters in the arrangement of BCCs 100. In this manner, a certain output voltage Vo or current Io of the BMC system 10 may be achieved. At the same time, the gate trigger signals Vgi are generated by the BCC controllers 1-n 110 in a manner that protects each battery in the BMC system 10. The functions of the BCC controllers 1-n 110 and the BMC controller 120 may be combined in certain embodiments and are further described below with reference to an example hierarchic structure of 1-n BCC controllers 110 and one BMC controller 120, for grid-tied or standalone DC or AC applications. For convenience of description only, an example is described in which each BCC in the arrangement of BCCs 100 includes a single battery cell. It is noted that, if m batteries are included in a BCC, the BCC may be considered a combination of m sub-BCCs. In this case, however, there may be a restriction for one or more gate signals Vgi of the m sub-BCCs. For example, the half bridge BCC of FIG. 6 includes two battery cells, and may be considered two sub-BCCs where a gate trigger signal Vg1 provided to one sub-BCC is complementary to a gate trigger signal Vg2 provider to the other sub-BCC.

Generally, each of the BCC controllers 1-n 110 estimates a status of at least one battery cell of a corresponding BCC in the arrangement of BCCs 100 and generates one or more gate trigger signals the corresponding BCC. In this context, each of the BCC controllers 1-n 110 collects battery status information such as voltage Vbi, current Ibi, temperature Tbi, etc., from the battery cell of its corresponding BCC in the arrangement of BCCs 100. Based on the battery status information, each BCC controller 1-n 110 estimates battery status parameters, such as state of charge SOCi, capacity Qi, state of health SOHi, etc., for the battery cell of its corresponding BCC. Based on the battery status parameters, the BCC controllers 1-n 110 generate a respective battery status signal Bsi which is provided to the BMC controller 120. Here, it is noted that the BMC controller 120 may receive a battery status signal Bsi for each of the BCCs in the arrangement of BCCs 100.

In one embodiment, state of charge SOCi may be defined as available charge in a battery cell, expressed as a percentage of present capacity. To estimate the SOCi, a coulomb counting method, based on counting the amount of charge being given to or taken from a cell over change in time, for example, may be relied upon. Cumulative error of estimated SOCi may be corrected using a lookup table LTi representative of a function of the battery terminal voltage Vbi and temperature Ti at a rest state whenever possible. SOCi may be defined or determined according to equation (2) below.

$$SOCi = \begin{cases} SOCi + \dfrac{I_{bi}\Delta t}{Qi} & \text{Dynamic: Coulomb Counting} \\ LTi(V_{bi}, Ti) & \text{Rest: Lookup Table} \end{cases} \quad (2)$$

Battery capacity Qi may be defined as total charge of a battery, discharging from SOCi=about 100% to about 0 or charging from SOCi=about 0 to about 100%. In one embodiment, estimation of Qi may be achieved based on another coulomb counting method which counts a total amount of charge given to or taken from a battery during one full cycle of charge or discharge. In this case, full-charge or full-discharge status of the battery may be determined by a lookup table, although no correction may be needed to the cumulative charge count during one full cycle. In this case, battery capacity Qi may be defined or determined according to equations (3) and/or (4) below.

$Qi = Qi - I_{bi}\Delta t$, from $V_{bi} = V_{1,Ti}$ to $V_{bi} = V_{0,Ti}$ for a full discharging cycle. (3)

$Qi = Qi + I_{bi}\Delta t$, from $V_{bi} = V_{0,Ti}$ to $V_{bi} = V_{1,Ti}$ for a full charging cycle. (4)

In equations (3) and (4) above, $V_{0,Ti}$ is battery terminal voltage at about 0% SOCi and $V_{1,Ti}$ is battery terminal voltage at about 100% SOCi, both measured at present temperature and when the battery is at a rest state, which can be found from a lookup table. The measurement may start at Qi=about 0.

SOHi is a figure of merit of the condition of a battery cell compared to its ideal conditions. For example, SOHi may be estimated based on comparing present capacity with initial capacity of a battery cell, as provided by equation (5) below.

$$SOHi = \dfrac{\dfrac{Q_i}{Q_{i_{initial}}} - y}{1 - y} \quad (5)$$

In equation (5), y is the ratio of end of lifecycle capacity to initial battery cell capacity, which is typically about 80% for most battery cells and applications.

Based on the battery status parameters, each of the BCC controllers 1-n 110 generates a corresponding battery status signal Bsi according to, for example, equation (6) below.

$$Bsi = f(|SOCi - \chi|)Q_i Vbi, \text{ where } \chi = \begin{cases} 1 & \text{charging} \\ 0 & \text{discharging} \end{cases}, \quad (6)$$

and f(x) may be any function that balances the SOCs of the system 10 in its entirety.

Each of the BCC controllers 1-n 110 also relies upon the battery voltage Vbi from its corresponding BCC in the arrangement of BCCs 100 and a corresponding reference signal Vcri from the BMC controller 120 to generate one or more gate trigger signals Vgi for one or more switches in the switching power converter of its corresponding BCC, for example, according to equation (7) below.

$$Vgi = \begin{cases} f(Vcri, Vbi) & SOHi > SOH_{min} \\ bypass & SOHi < SOH_{min} \end{cases} \quad (7)$$

In the normal state, when SOH is above a predetermined threshold (e.g., SOHi>$SOH_{min}$), the gate trigger signal may be derived by using the switching converter gain according to equations (8) and (9) below.

$$\frac{Vcri}{Vbi} = M(d) \quad (8)$$

$$Vgi = d, \quad (9)$$

where M(d) is input to output gain of a switching power converter as a function of duty ratio d, depending on the switching power converter used in the corresponding BCC in the arrangement of BCCs 100. For example, the input to output gain may be determined according to equation (10) below.

$$M(d) = \begin{cases} d & buck \\ \frac{1}{1-d} & boost \\ \frac{d}{1-d} & buckboost \\ 2d-1 & H-bridge \end{cases} \quad (10)$$

Using a boost converter as an example, the gate trigger signal for the normal state can be derived according to equation (11) below.

$$Vgi = f(Vcri, Vbi) = \frac{\frac{Vcri}{Vbi} - 1}{\frac{Vcri}{Vbi}} \quad (11)$$

However, in certain embodiments, if the SOHi for a given BCC in the arrangement of BCCs 100 is below a threshold (e.g., SOHi<$SOH_{min}$), then the gate trigger signals Vgi for the given BCC may follow a predetermined pattern to bypass the given BCC. In this case, the BCC controller 1-n 100 associated with the given BCC will also set the associated Bsi to a recognized value, such as 0, for example, to inform the BMC controller 120 to bypass the given BCC.

The BMC 120 may be relied upon for both grid-tied and/or standalone applications. For grid-tied applications, Vo of the BMC system 10 is provided as measured feedback at the grid connect point while Io is provided as a current reference signal to control battery current. For standalone applications, the control function is similar except that Io of the BMC system 10 is provided as measured feedback while Vo is provided as a voltage reference signal to control the battery management converter system output voltage. In either case, the voltage Vo is relied upon by the BMC controller 120 to generate the voltage reference signals Vcri.

It should be appreciated that some embodiments rely upon charging from a grid-tied AC or DC source, but discharge to a standalone DC or AC source. For example, an AC power grid may be relied upon to charge a BMC system similar to the BMC system 10, but when the grid fails, the BMC system may supply a voltage that replaces the grid to continuously support one or more loads. The BMC controller 120 may be reconfigured, to the extent necessary, to serve this purpose.

In one aspect of the embodiments, the BMC controller 120 may generate or determine the voltage reference signals Vcri based on a comparison between the battery status signals Bsi from the BCC controllers 1-n 110. For example, the BMC controller 120 may generate or determine the voltage reference signals Vcri in an effort to balance the SOCi of the batteries cells among the BCCs in the arrangement of BCCs 100. In one embodiment, the BMC controller 120 may generate the voltage reference signals Vcri to satisfy at least one of the following two conditions: (1) $\Sigma_{i=1}^{n}$ Vcri=Vcr to comply with converter control requirements, and (2) Vcri≤MVbi is to comply with the capabilities of each BCC, where M is the maximum possible gain of the switching converter in the BCC, depending on the topology of the BCCs. For example, for a buck type BCC, M may be equal to about 1 and, for a boost type BCC, M may be greater than about 1.

To comply with condition (1), the reference voltage Vcri for each of the BCC controllers 1-n 110 is calculated according to equation (12) below.

$$Vcri = \frac{Bsi}{\sum_{k=1}^{n} Bsk} Vcr, \text{ where } \chi = \begin{cases} 1 & Charging \\ 0 & Discharging \end{cases} \quad (12)$$

Bsi is given by (6), where $f(x)$ may be any function that balances the SOCs of the system 10. One simple example embodiment is $f(x)=x^p$, where p>0, the speed of balancing can be increased by choosing a larger p.

To comply with condition (2), if the reference voltage Vcri for a particular BCC (e.g., the $k^{th}$ BCC in a series string of BCCs, where 1≤k≤n, Vcrk) calculated by (12) is greater than its limit (i.e., the maximum voltage capability of the corresponding BCC Vcrk>MVbk), then the reference voltage Vcrk for the $k^{th}$ BCC is set at its maximum limit (corresponding MVbk) and equation (12) may be recalculated for all other BCCs, recognizing the effect of the fixed maximum reference voltage in order to comply with condition 1.

Figure 7:
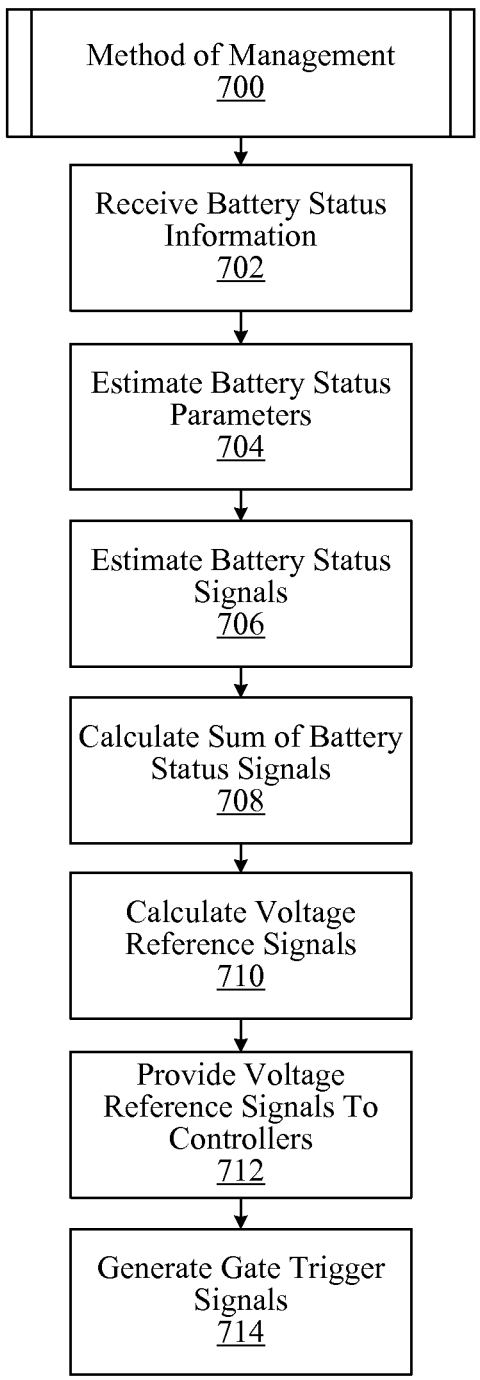
FIG. 7 illustrates an example process flow diagram for a method of management in a battery converter system.

Referring next to FIG. 7, a flowchart illustrating example operations of a process 700 of management in a battery converter system are provided. In certain aspects, the flowcharts of FIG. 7 may be viewed as depicting example steps of a method of management implemented by the BMC system 10 of FIG. 1. Although the process of FIG. 7 is described in connection with the BMC system 10 of FIG. 1, control or management systems that operate according to the processes illustrated are within the scope of the embodiments. Further, it should be understood that the flowchart of FIG. 7 provide only examples of different functional or process arrangements that may be employed according to the embodiments described herein.

In the context provided above, the process 700 may be used to calculate the voltage reference signals Vcri and generate the gate trigger signals Vgi to control power charging or discharging distribution among the BCCs in the arrangement of BCCs 100. At reference numeral 702, the process 700 includes each of the BCC controllers 1-n 110 receiving battery status information (e.g., Vbi, Ibi, and Tbi information) from a respective one of the BCCs in the arrangement of BCCs 100. With reference to or based on the battery status information, at reference numeral 704, the process 700 includes each of the BCC controllers 1-n 110 estimating battery status parameters, such as state of charge SOCi, capacity Qi, state of health SOHi, etc., for the battery cell of its corresponding BCC. At reference numeral 706, the process 700 includes each of the BCC controllers 1-n 110 calculating a battery status signal Bsi for a respective one of the BCCs in the arrangement of BCCs 100, and providing the battery status signal Bsi to the BMC controller 120. In one embodiment, each battery status signal Bsi may be calculated based on the equation (6) above.

At reference numeral 708, the process 700 includes the BMC controller 120 calculating a sum S of the battery status signals Bsi. For example, the sum may be determined according to $S = \Sigma_{i=1}^{n} Bsi$. At reference numeral 710, the process 700 includes, starting from the largest Bsi to the smallest, the BMC controller 120 calculating or generating (A)

$$Vcri = \frac{Bsi}{S} Vcr,$$

and (B) if, for the $k^{th}$ BCC, Vcrk>MVbk, then assign Vcrk=MVbk, Vcr=Vcr−MVbk, and S=S−BSk. At reference numeral 712, the process 700 includes the BMC controller 120 providing the voltage reference signals Vcri to corresponding ones of the BCCs in the arrangement of BCCs 100, to control power charging or discharging distribution among the BCCs. Finally, at reference numeral 714, the process 700 includes each of the BCC controllers 1-n 110 generating gate trigger signals Vgi for a corresponding BCC in the arrangement of BCCs 100 based on the received voltage reference signal Vcri. The generation of the gate trigger signals Vgi may be conducted as described above in connection with one or more of equations (7), (8), or (9), for example. It should be appreciated that the process 700 may continue over time as necessary to control power charging or discharging distribution among the BCCs in the arrangement of BCCs 100.

Although the process diagram of FIG. 7 illustrates an order, it should be appreciated that the order of the steps in the process may differ from that which is depicted. For example, an order of execution of two or more blocks may be scrambled relative to the order shown. Also, two or more blocks shown in succession in FIG. 7 may be executed concurrently or with partial concurrence. Further, in some embodiments, one or more of the blocks may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the embodiments.

Turning to a simulated empirical analysis of the BMC system 10, it is noted that, since battery cells in a battery pack are typically of the same type and age, are kept substantially balanced by the BMC system 10, and are charged and discharged at about the same rate, their terminal voltages may be almost the same. Therefore, the battery voltage feedback Vbi may be neglected when evaluating equation (6) and when calculating Bsi.

To verify aspects of the embodiments, one small scale example of a BMC system, consisting of five full-bridge DC-AC BCCs, was simulated. The BCCs use batteries of the same type, Lithium Iron Phosphate (LiFePO$_4$), with nominal voltage 3.3V, but were given different capacities and initial SOCs, as specified in Table 1 below. The five BCCs were cascaded to build a system connected to a grid with peak voltage 12V (8.5V rms) and frequency 60 Hz through a shared 200 µH inductor. The system was controlled to discharge the batteries and supply 40 A peak (28.3 A rms) to the grid in phase with the grid voltage over a time span of five minutes. Subsequently, the system was controlled to sink 40 A peak (28.3 A rms) from the grid to charge the batteries over a time span of five minutes.

Figure 8A:
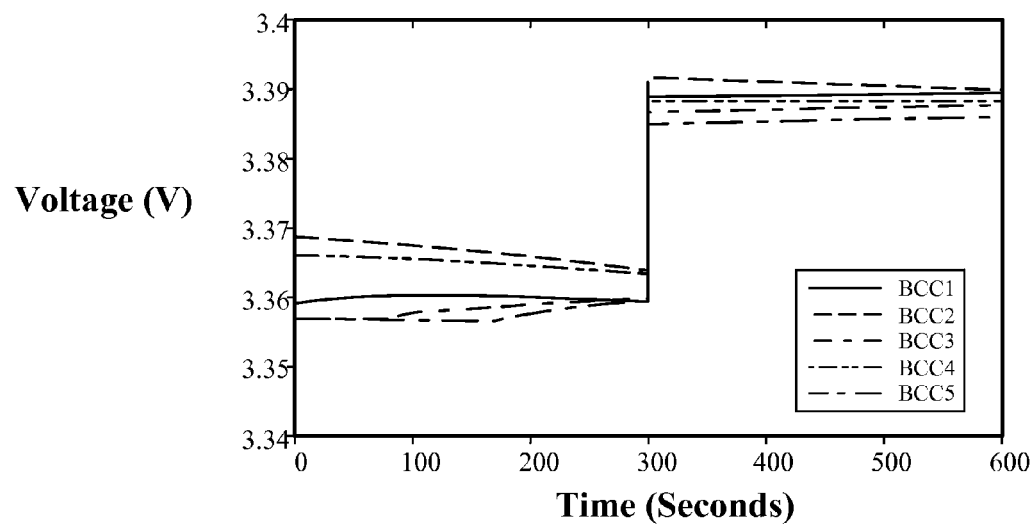
FIGS. 8A-8D illustrate results of a simulation of a battery management converter system according to an example embodiment.
Figure 8B:
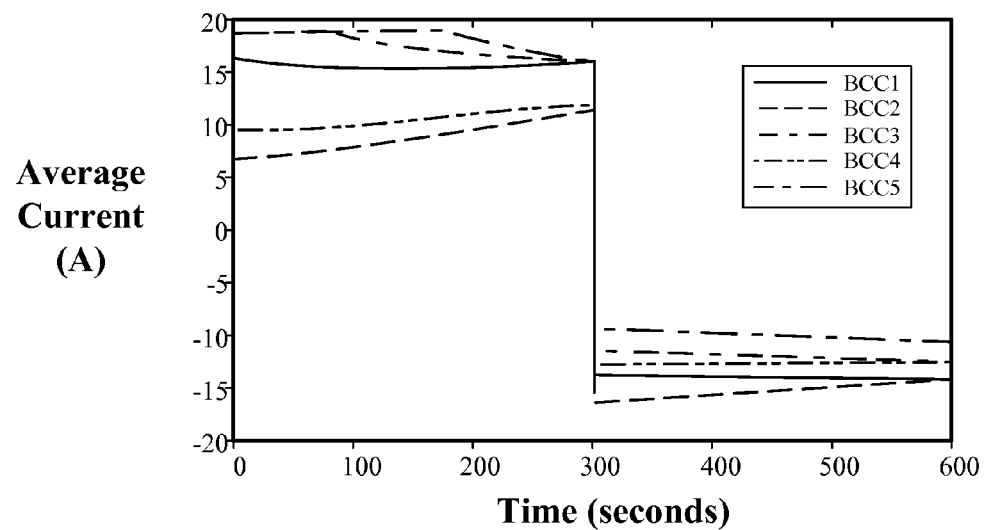
Figure 8C:
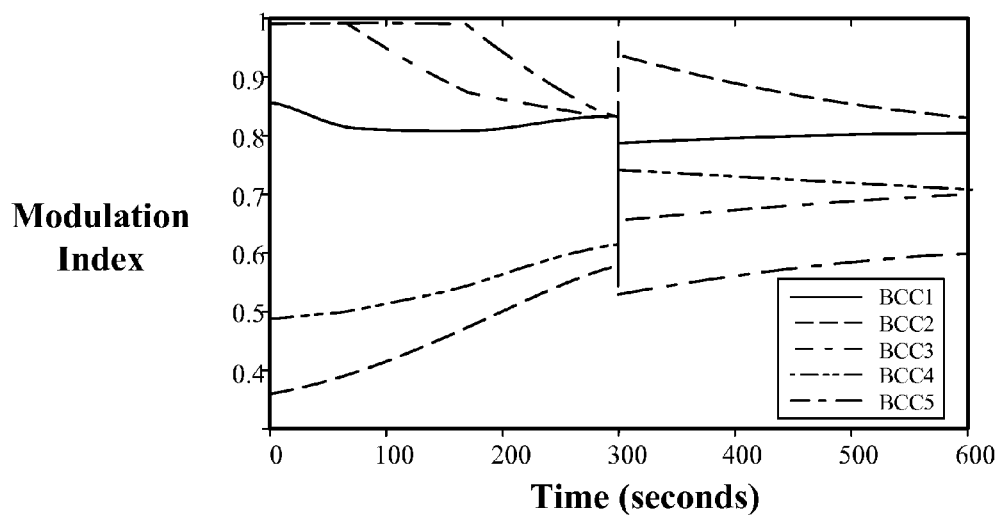
Figure 8D:
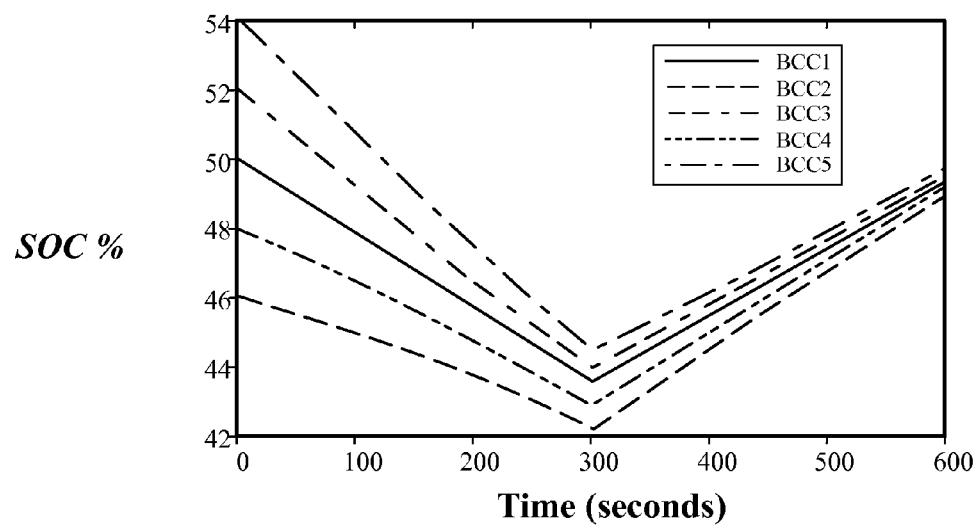

FIGS. 8A-8D illustrate results of a simulation of a BMC system according to an example embodiment. FIGS. 8A-B illustrates simulation results when a balancing function $f(x) = x^{10}$ is used to generate battery status signals Bsi in the distribution control algorithm. Particularly, FIG. 8A illustrates battery cell voltages (Vbi), FIG. 8B illustrates battery cell average currents (Ibi), FIG. 8C illustrates modulation indexes of BCCs (Vcri/Vbi), and FIG. 8D illustrates the state of charge of BCCs (SOC$_i$). From the simulation result, it is evident that the SOC of all the battery cells converge to the same value both at charging and discharging mode at a speed determined by $f(x)$.

TABLE 1

| Parameters Cell number | Capacity Q (Ah) | Initial SOC (%) |
| --- | --- | --- |
| BCC1 | 20 | 50 |
| BCC2 | 19 | 46 |
| BCC3 | 18 | 52 |
| BCC4 | 17 | 48 |
| BCC5 | 16 | 54 |

With regard to the manner in which the BMC system 10, and particularly the BCC controllers 1-n 110 and/or the BMC controller 120, are embodied, it is noted that each may comprise combinatorial logic, one or more general purpose arithmetic processors or processing circuits, state machines, and/or Application Specific Integrated Circuits ("ASICs"), for example. Each processor or processing circuit may be configured to execute one or more non-transitory computer-readable software instructions or instruction modules. In certain embodiments, each processor or processing circuit may comprise a state machine or ASIC, and the processes and functions described herein may be determined or evaluated by the state machine or ASIC according to the computer-readable instructions.

The processors or processing circuits may rely upon one or more suitable memories that store computer-readable instructions to be executed by processors or processing circuits. These memories and/or registers may store computer-readable instructions thereon that, when executed by the processors or processing circuits, direct the processors or processing circuits to execute various aspects of the embodiments described herein.

As a non-limiting example group, the memories and/or registers may include one or more of an optical disc, a magnetic disc, a semiconductor memory (i.e., a semiconductor, floating gate, or similar flash based memory), a magnetic tape memory, a removable memory, combinations thereof, or any other known memory means for storing computer-readable instructions. In certain aspects, the processors or processing circuits are configured to retrieve computer-readable instructions and/or data stored on the memories and/or registers for execution. The processors or processing circuits are further configured to execute the computer-readable instructions to implement various aspects and features of the embodiments described herein.

Although embodiments have been described herein in detail, the descriptions are by way of example. The features of the embodiments described herein are representative and, in alternative embodiments, certain features and elements may be added or omitted. Additionally, modifications to aspects of the embodiments described herein may be made by those skilled in the art without departing from the spirit and scope of the present invention defined in the following claims, the scope of which are to be accorded the broadest interpretation so as to encompass modifications and equivalent structures.

At least the following is claimed:

1. A battery management converter system, comprising:
    an arrangement of a plurality of battery converter cells, each battery converter cell including a switching power converter having an output and an input coupled to one or more battery cells, the outputs of each of the switching power converters being electrically coupled in a series arrangement to provide an alternating current (AC) or direct current (DC) system power output for coupling to a load;
    a battery converter cell controller for each of the plurality of battery converter cells, wherein each battery converter cell controller:
        receives battery status parameter information from a respective one of the plurality of battery converter cells;
        generates at least one gate control trigger signal for the respective one of the plurality of battery converter cells; and
        generates a battery status signal based on the battery status parameter information and a charging state of the respective one of the plurality of battery converter cells; and
    a battery management converter controller that receives the battery status signal from each battery converter cell controller and provides voltage reference signals to the plurality of battery converter cells to control power charging or discharging distribution and to balance batteries among the plurality of battery converter cells.

2. The system according to claim 1, wherein the battery status parameter information comprises at least one of battery cell output voltage, battery cell output current, or battery cell temperature information.

3. The system according to claim 1, wherein the switching power converter of each of the plurality of battery converter cells comprises any one of a buck, boost, buckboost, full-bridge, half-bridge, Ćuk, single-ended primary-inductor converter (SEPIC), or Zeta power converter.

4. The system according to claim 1, wherein the battery management converter controller generates the voltage reference signals to control power charging or discharging distribution among the plurality of battery converter cells based on a comparison of the battery status signal from each battery converter cell controller.

5. The system according to claim 1, wherein the battery management converter controller generates the voltage reference signals to control power charging or discharging distribution among the plurality of battery converter cells based on a maximum gain of the switching power converters among the plurality of battery converter cells.

6. The system according to claim 1, wherein the battery management converter controller balances a state of charge of the one or more battery cells in each of the plurality of battery converter cells.

7. A battery management converter control method, comprising:
    receiving, by a plurality of battery converter cell controllers, battery status information from a plurality of battery converter cells, each battery converter cell including a switching power converter having an output and an input coupled to one or more battery cells, the outputs of each of the switching power converters being electrically coupled in a series arrangement to provide a system power output for coupling to a load;
    estimating, by the plurality of battery converter cell controllers, battery status parameters for the plurality of battery converter cells;
    calculating, by the plurality of battery converter cell controllers, battery status signals for the plurality of battery converter cells based on the battery status parameters and a charging state of each of the battery converter cells;
    generating, by a battery management controller, voltage reference signals for the plurality of battery converter cell controllers; and
    generating, by the plurality of battery converter cell controllers, at least one gate control trigger signal based on the voltage reference signals.

8. The method according to claim 7, further comprising controlling power charging or discharging distribution and balancing batteries among the plurality of battery converter cells based on the at least one gate control trigger signal.

9. The method according to claim 7, wherein generating the voltage reference signals comprises, starting from a largest one of the battery status signals to a smallest one of the battery status signals, generating a respective voltage reference signal for each of the plurality of battery converter cell controllers based on a corresponding one of the battery status signals and a sum of the battery status signals.

10. The method according to claim 7, wherein the battery status parameters comprise state of charge, capacity, and state of health parameters.

11. A battery management converter system, comprising:
    an arrangement of a plurality of battery converter cells, each battery converter cell including a switching power converter having an output and an input coupled to one or more battery cells, the outputs of each of the switching power converters being electrically coupled in a series arrangement to provide a system power output for coupling to a load;
    at least one battery converter cell controller for the plurality of battery converter cells, wherein the at least one battery converter cell controller:
        receives battery status parameter information from at least one of the plurality of battery converter cells;
        generates at least one gate control trigger signal for the at least one of the plurality of battery converter cells; and
        generates a battery status signal based on the battery status parameter information and a charging state of the at least one of the plurality of battery converter cells; and a battery management converter controller that receives the battery status signal and generates a voltage reference signal for the at least one of the plurality of battery converter cells.

12. The system according to claim 11, wherein the battery status parameter information comprises at least one of battery cell output voltage, battery cell output current, or battery cell temperature information.

13. The system according to claim 11, wherein each of the plurality of battery converter cells comprises at least one of a buck, boost, buckboost, full-bridge, half-bridge, Ćuk, single-ended primary-inductor converter (SEPIC), or Zeta switching power converter.

14. The system according to claim 11, wherein the battery management converter controller further:
receives a voltage feedback signal from a power grid and a current reference signal from a user through a user interface; and
generates a voltage reference signal for the at least one of the plurality of battery converter cells based at least in part on the voltage feedback signal and the current reference signal.

15. The system according to claim 11, wherein the battery management converter controller further:
receives a current feedback signal from a load and a voltage reference signal from a user through a user interface; and
generates a voltage reference signal for the at least one of the plurality of battery converter cells based at least in part on the current feedback signal and the voltage reference signal.

16. The system according to claim 11, wherein the at least one battery converter cell controller generates the battery status signal according to a function of at least one of a state of charge, voltage, capacity, or charging or discharging information of a battery cell in the at least one of the plurality of battery converter cells.

17. The system according to claim 11, wherein the battery management converter controller:
receives at least one voltage or current feedback signal from the at least one of the plurality of battery converter cells;
generates the voltage reference signal for the at least one of the plurality of battery converter cells based at least in part on the at least one voltage or current feedback signal; and
generates the gate control trigger signal for the at least one of the plurality of battery converter cells according to a function of the battery status signal and the voltage reference signal.

18. The system according to claim 11, wherein the battery management converter controller:
receives at least one voltage or current feedback signal from the at least one of the plurality of battery converter cells;
generates the voltage reference signal for the at least one of the plurality of battery converter cells based at least in part on the at least one voltage or current feedback signal; and
generates the gate control trigger signal for the at least one of the plurality of battery converter cells according to a function of a voltage of a battery cell in the at least one of the plurality of battery converter cells, the voltage reference signal, and a topology of a switching power converter of the at least one of the plurality of battery converter cells.

* * * * *